Patented Aug. 12, 1952

2,606,880

UNITED STATES PATENT OFFICE 2,606,880

ACID-CURING THERMOSETTING RESINS CONTAINING ESTERS OF OXANILIC ACID AS LATENT CATALYSTS THEREFOR

John A. Yourtee, Fredericksburg, Va., assignor to American Viscose Corporation, Wilmington, Del., a corporation of Delaware No Drawing. Application April 26, 1949, Serial No. 89,804

20 Claims. (Cl. 260—17.3)

This invention relates to stable compositions comprising acid-curing thermosetting condensates or resins admixed with a latent curing catalyst which does not become available as catalyst until the composition is subjected to curing conditions, and more patricularly to such compositions comprising a urea-formaldehyde condensate or resin.

Many of the catalysts which have been proposed heretofore for use in conjunction with acid-curing thermosetting resins function as catalysts at relatively low temperatures with the result that if the resin is subjected to such temperatures prior to curing to final form, partial or complete curing is effected. If the compositions containing such catalysts are stored the resin may be partially or wholly cured even at the normal temperatures of storage with the result that the compositions, for example molding powders, undergo a loss of proper flow characteristics. Furthermore, if it is desired to subject the composition comprising the resin and catalyst to preliminary mild heating without curing the resin, as may be necessary in certain applications, such as in coating or impregnating textiles, in laminating, etc., then it is essential to use a curing catalyst which is inactive at low temperatures but which will function to expedite curing of the resin at higher temperatures.

One object of this invention is to provide new latent catalysts or accelerators for acid-curing thermosetting resins. Another object is to provide compositions comprising a thermosetting resin and a latent acid-curing catalyst, which compositions are stable at ordinary temperatures and exhibit improved curing and molding properties. Another object is to provide compositions having improved water resistance, and flow characteristics which do not alter during storage, i. e., flow characteristics which, during storage, are not affected by the catalyst. Another object is to provide such compositions in which the resin is not chemically modified or combined with the catalyst, and the catalyst is physically intimately mixed with the resin.

These and other objects of the invention are attained by mixing with the acid-curing thermosetting condensate or resin, or compositions containing it, as a latent curing catalyst, a hydrolyzable ester of oxanilic acid. By "hydrolyzable ester of oxanilic acid" is meant esters which are stable under normal storage conditions, but which are hydrolyzed under the molding or curing conditions, i. e. at temperatures of from about 135 to 165° C., with liberation of oxanilic acid.

Esters which are included in the scope of the invention are alkyl, aryl, and aralkyl esters, for example, ethyl, methyl, propyl, butyl, phenyl, and benzyl esters, etc. Although the hydrolyzable esters generally are serviceable as latent curing catalyst, in the preferred embodiment of the invention, the catalyst comprises methyl or ethyl oxanilate.

Various fillers may be incorporated with the acid-curing thermosetting resin, including wood flour, asbestos, cotton linters, cellophane or other forms of regenerated cellulose, clay, etc. Coloring materials and lubricants may be included, if desired. Zinc stearate or other mold lubricant may be added. For some purposes, it may be desirable, also, to add modifying agents such as starches, gums, alginates, casein, etc. Plasticizing and impregnating agents may also be incorporated.

Molding compositions may be prepared by any of the methods known in the art. Thus, a resin syrup may be prepared first and the filler impregnated with the syrup in a subsequent operation. The filler content in percentage, the composition of the resin (mole ratio of the resin-forming constituents and proportions of minor reactants or assistants), and the processing conditions may be varied as well known in the art. Generally, when the composition is a molding composition containing the resin and a filler, the resin is preferably present in an amount of from 60 to 70 parts, the filler being present in an amount of from 30 to 40 parts.

Usually only a small portion of the oxanilic acid ester is required to produce rapid cures under molding conditions, for example, 0.05% to 2% by weight of the molding composition. Generally, the molding is performed at a temperature between about 135° C. and 165° C.

The inclusion of a small amount, from 0.01 to 0.1% by weight of hexamethylenetetramine during the incorporation of the oxanilic acid ester may be found favorable, and will assist in stabilizing the pH of the composition. Instead of hexamethylenetetramine, small amounts of other suitable bases may be substituted as the catalyst "buffer." However, hexamethylenetetramine is preferred.

The following examples are given by way of illustrating the invention, it being understood that the examples are not to be interpreted as limitative.

*Example I*

A dried, substantially neutral composition containing 35 parts of cellulose pulp filler impregnated with 65 parts of a urea-formaldehyde reaction product was ground in a cooled ball mill with 0.25 part of ethyl oxanilate and 0.05 part of hexamethylenetetramine. The composition was sifted. It may be used for molding in the powder form, or after granulation.

Test moldings of the composition were prepared at 2500 pounds per square inch, 280° F., tested for water absorption and flow, and compared with moldings prepared from a composition prepared under similar conditions but which did not contain the latent catalyst. The flow characteristics of the composition comprising the ethyl oxanilate remained unchanged. Water absorption and surface appearance of the molded articles, after 15 minutes in boiling water, compared, as follows:

|  | Without Catalyst | With Catalyst |
| --- | --- | --- |
| Water absorption_____percent__ | 3.1 | 2.2 |
| Surface appearance_____ | Good | Excellent |

Example II

A dried, substantially neutral composition containing 35 parts of a cellulose pulp filler impregnated with 65 parts of a urea-formaldehyde condensate was ground in a cooled ball mill with 0.5 part of methyl oxanilate and 0.05 part of hexamethylenetetramine.

Example III

A dried, substantially neutral composition containing 35 parts of a cellulose pulp filler impregnated with 65 parts of a melamine-urea-formaldehyde condensate in which the molar ratio of melamine to urea was 1:9, was ground in a cooled ball mill with 0.25 part of ethyl oxanilate and 0.05 part of hexamethylenetetramine.

The hydrolyzable oxanilate may be added at any point in the preparation of the molding composition where subsequent heating and/or moisture treatment will not cause premature catalyst activity. Mixtures of the hydrolyzable oxanilates may be used, if desired.

Other acid-curing thermosetting resins may be substituted for all or part of the resins employed in the examples. The term "acid-curing resin" includes those resins or condensates which may be cured only under acid conditions and also those which may be cured under either acid or alkaline conditions. Such resins include those obtained by reacting an aldehyde, e. g., formaldehyde, acetaldehyde, benzylaldehyde, etc. with the following: thiourea, the reaction products obtained by heating and decomposing dicyandiamide, melamine, other amino-triazines etc. The molding composition may also comprise mixed resins, for example, urea-melamine-formaldehyde resins, urea-thiourea-formaldehyde resins, etc.

The time required to cure compositions including an acid-curing thermosetting resin and a hydrolyzable oxanilic acid ester as described herein will vary somewhat with the size of the piece being molded, the particular ester of oxanilic acid used as catalyst, the particular resin, and with the temperatures at which the composition is cured. Generally, the time required for molding small articles is between about one half minute and three minutes at temperatures between about 135 and 165° C., at pressures of from 3000 to 5000 pounds per square inch.

The hydrolyzable ester of oxanilic acid may be employed in molding powders or in solid compositions which have been pressed by hot pressing into sheets, rods, or other units, as well as in compatible syrups containing acid-curing thermosetting resins for use in coating, impregnating or laminating compositions for textiles or other materials, in adhesives etc. The compositions containing the latent catalysts of the invention are stable commercially i. e., they are stable at normal temperatures and may be stored safely. In some instances, the hydrolyzable esters of oxanilic acid used as latent curing accelerators in accordance with the invention also exert a plasticizing action during molding operations.

Obviously many modifications and variations in the process and compositions described above may be made without departing from the spirit and scope of the invention as defined in the appended claims.

I claim:

1. A composition comprising an acid-curing thermosetting aminoplast resin and, as a latent curing catalyst, ethyl oxanilate.

2. A composition comprising an acid-curing thermosetting aminoplast resin and, as a latent curing catalyst, methyl oxanilate.

3. A composition comprising a melamine-urea-formaldehyde resin and, as a latent curing catalyst, an alkyl ester of oxanilic acid hydrolyzable at a temperature from about 135 to 165° C.

4. A composition as in claim 3, wherein the catalyst is ethyl oxanilate.

5. A composition as in claim 3, wherein the catalyst is methyl oxanilate.

6. A composition comprising a thiourea-formaldehyde resin and, as a latent curing catalyst, an alkyl ester of oxanilic acid hydrolyzable at a temperature from about 135 to 165° C.

7. A composition comprising a melamine-formaldehyde resin and, as a latent curing catalyst, an alkyl ester of oxanilic acid hydrolyzable at a temperature from about 135 to 165° C.

8. A composition as in claim 7, wherein the catalyst is ethyl oxanilate.

9. A composition as in claim 7, wherein the catalyst is methyl oxanilate.

10. A molding composition comprising an acid-curing thermosetting aminoplast resin, a latent curing catalyst comprising an alkyl ester of oxanilic acid hydrolyzable at a temperature from about 135 to 165° C., and a filler said composition being substantially dry and neutral.

11. A molding composition comprising an acid-curing thermosetting aminoplast resin, a latent catalyst comprising an alkyl ester of oxanilic acid hydrolyzable at a temperature from about 135 to 165° C., and cellulose pulp said composition being substantially dry and neutral.

12. A molding composition comprising a urea-formaldehyde resin, a latent catalyst comprising an alkyl ester of oxanilic acid hydrolyzable at a temperature from about 135 to 165° C., and a filler said composition being substantially dry and neutral.

13. A molding composition comprising a melamine-formaldehyde resin, a latent catalyst comprising an alkyl ester of oxanilic acid hydrolyzable at a temperature from about 135 to 165° C., and a filler.

14. A molding composition comprising a melamine-urea-formaldehyde resin, a latent catalyst comprising an alkyl ester of oxanilic acid hydrolyzable at a temperature from about 135 to 165° C., and a filler.

15. A process of curing a urea-formaldehyde resin which comprises mixing such a resin in a dry and neutral state with a dry and neutral hydrolyzable alkyl ester of oxanilic acid which is a latent curing catalyst hydrolyzable at a temperature from about 135 to 165° C., and subjecting the substantially dry and neutral mixture to a temperature of at least about 135° C.

16. A composition comprising an acid-curing thermosetting aminoplast resin and, as a latent curing catalyst, an alkyl ester of oxanilic acid hydrolyzable at a temperature from about 135 to 165° C., said composition being substantially dry and neutral.

17. A process of curing an acid-curing thermosetting aminoplast resin which comprises mixing such a resin in a dry and neutral state with a dry and neutral alkyl ester of oxanilic acid hydrolyzable at a temperature from about 135 to 165° C. as a latent curing catalyst and subjecting the substantially dry and neutral mixture to a temperature of at least about 135° C.

18. A composition comprising a urea-formaldehyde resin and, as a latent curing catalyst, an alkyl ester of oxanilic acid hydrolyzable at a temperature from about 135 to 165° C., said composition being substantially dry and neutral.

19. A composition as in claim 18, wherein the catalyst is ethyl oxanilate.

20. A composition as in claim 18, wherein the catalyst is methyl oxanilate.

JOHN A. YOURTEE.

REFERENCES CITED

The following references are of record in the file of this patent:

UNITED STATES PATENTS

| Number | Name | Date |
|---|---|---|
| 2,322,566 | D'Alelio | June 22, 1943 |
| 2,343,497 | Cosgrove | Mar. 7, 1944 |
| 2,414,025 | Cordier | Jan. 7, 1947 |

FOREIGN PATENTS

| Number | Country | Date |
|---|---|---|
| 240,840 | Great Britain | Mar. 20, 1927 |
| 358,470 | Great Britain | Oct. 5, 1931 |